US010840985B2

(12) United States Patent
Osawa et al.

(10) Patent No.: US 10,840,985 B2
(45) Date of Patent: Nov. 17, 2020

(54) USER TERMINAL AND RADIO COMMUNICATION METHOD

(71) Applicant: NTT DOCOMO, INC., Tokyo (JP)

(72) Inventors: Ryosuke Osawa, Tokyo (JP); Hiroki Harada, Tokyo (JP); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/495,499

(22) PCT Filed: Mar. 22, 2017

(86) PCT No.: PCT/JP2017/011506
§ 371 (c)(1),
(2) Date: Sep. 19, 2019

(87) PCT Pub. No.: WO2018/173163
PCT Pub. Date: Sep. 27, 2018

(65) Prior Publication Data

US 2020/0014448 A1 Jan. 9, 2020

(51) Int. Cl.
*H04B 7/04* (2017.01)
*H04B 7/06* (2006.01)

(52) U.S. Cl.
CPC ......... *H04B 7/0626* (2013.01); *H04B 7/0641* (2013.01)

(58) Field of Classification Search
CPC .. H04B 7/0613; H04B 7/6017; H04B 7/0619; H04B 7/0621; H04B 7/0626; H04B 7/0641; H04B 7/0695; H04B 7/088
See application file for complete search history.

(56) References Cited

U.S. PATENT DOCUMENTS 9,276,714 B2 * 3/2016 Moulsley ............... H04B 7/024
2016/0150470 A1 * 5/2016 Fujishiro ............. H04W 36/165 370/311
2017/0078903 A1 * 3/2017 Kusashima ........... H04W 24/10
2017/0238207 A1 * 8/2017 Hwang .................... H04J 11/00 370/252
2018/0227838 A1 * 8/2018 Hayashi .................. H04L 5/001

OTHER PUBLICATIONS

International Search Report issued in PCT/JP2017/011506 dated Jun. 6, 2017 (1 page).
Written Opinion of the International Searching Authority issued in PCT/JP2017/011506 dated Jun. 6, 2017 (4 pages).

(Continued)

*Primary Examiner* — Siu M Lee
(74) *Attorney, Agent, or Firm* — Osha Bergman Watanabe & Burton LLP

(57) ABSTRACT

A terminal is disclosed including a transmitter that transmits information regarding at least one reception power (RSRP: Reference Signal Received Power) and a processor that, when reporting of a first RSRP and a second RSRP is carried out, controls to transmit a value corresponding to the first RSRP, and a value corresponding a difference between the first RSRP and the second RSRP. In other aspects, a radio communication method is disclosed.

7 Claims, 9 Drawing Sheets

(56) References Cited

OTHER PUBLICATIONS

ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
Extended European Search Report issued in Application No. 17902436.9, dated Sep. 21, 2020 (6 pages).
3GPP TSG RAN WG1 Meeting #88; R1-1701714; "Discussion on downlink beam measurement and UE reporting procedure;" Huawei, HiSilicon; Feb. 13-17, 2017; Athens, Greece (10 pages).

* cited by examiner

| BEAM PAIR INDEX | TRANSMISSION BEAM INDEX | RECEPTION BEAM INDEX |
|---|---|---|
| 0 | 0 | 0 |
| 1 | 0 | 1 |
| 2 | 0 | 2 |
| 3 | 1 | 0 |
| 4 | 1 | 1 |
| 5 | 1 | 2 |
| 6 | 2 | 0 |
| 7 | 2 | 1 |

gNB
RECEPTION BEAM
0
1
2
TRANSMISSION BEAM
0
1
2
UE
MEASUREMENT REPORT gNB
RECEPTION BEAM
0
1
2
TRANSMISSION BEAM
0
1
2
UE
DESIGNATE BPL
MEASUREMENT REPORT

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and low latency, Long Term Evolution (LTE) has been specified (Non-Patent Literature 1). Furthermore, for the purpose of wider bands and a higher speed than LTE (also referred to as LTE Rel. 8 or 9), LTE-A (also referred to as LTE advanced or LTE Rel. 10, 11 or 12) has been specified, and successor systems of LTE (also referred to as, for example, Future Radio Access (FRA), a 5th generation mobile communication system (5G), New Radio (NR), New radio access (NX), Future generation radio access (FX) or LTE Rel. 13, 14, 15 or subsequent versions) have been also considered.

Existing LTE systems (e.g., LTE Rel. 8 to 13) perform communication on DownLink (DL) and UpLink (UL) by using a subframe (also referred to as Transmission Time Intervals (TTI)) of 1 ms. This subframe is a transmission time unit of one data packet subjected to channel coding, and is a processing unit of scheduling, link adaptation, and retransmission control (HARQ: Hybrid Automatic Repeat reQuest).

CITATION LIST

Patent Literature

Non-Patent Literature 1:3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

Future radio communication systems (e.g., 5G and NR) are requested to realize various radio communication services while meeting different request conditions (e.g., an ultra high speed, a large volume and ultra low latency).

For example, it is considered for NR to provide radio communication services that are referred to as enhanced Mobile Broad Band (eMBB), massive Machine Type Communication (mMTC), and Ultra Reliable and Low Latency Communications (URLLC).

It is considered for NR to use Beam Forming (BF) for both of transmission and reception for main purposes of reducing difficulty in securing a coverage accompanying an increase in a carrier frequency, and reducing radio wave propagation loss. On the other hand, it is considered that, when BF is applied, a user terminal uses a plurality of beams (e.g., reception beams).

However, existing LTE systems do not take application of the reception beams into account when calculating received quality (e.g., RSRP). When communication is controlled based on the RSRP that does not taken the reception beams into account in a case where the reception beams are applied, there is a risk of deterioration of communication quality.

The present invention has been made in light of such a problem, and one of objects of the present invention to provide a user terminal and a radio communication method that can prevent deterioration of communication quality even when the user terminal applies beam forming to reception.

Solution to Problem

A user terminal according to one aspect of the present invention includes: a receiving section that receives a DL signal; and a control section that controls reporting of a measurement report associated with a predetermined reception beam based on the received DL signal, and the control section determines the predetermined reception beam based on information notified from a radio base station or autonomously.

Advantageous Effects of Invention

According to the present invention, even when a user terminal applies beam forming to reception, it is possible to prevent deterioration of communication quality.

DESCRIPTION OF EMBODIMENTS

Figures 1A, 1B:
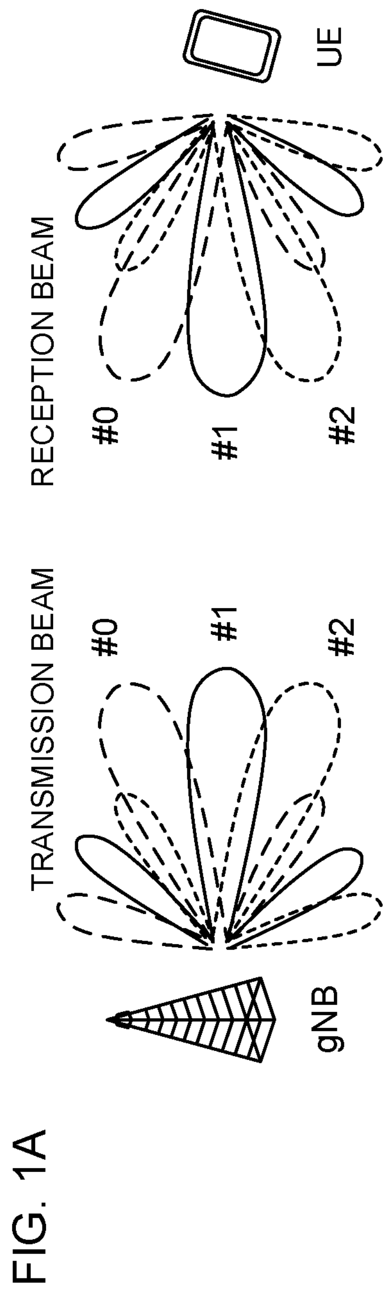
FIGS. 1A and 1B are diagrams illustrating one example of beam pairs.

It is considered for future radio communication systems (e.g., NR) to use Beam Forming (BF) for both of transmission and reception for main purposes of reducing difficulty in securing a coverage accompanying an increase in a carrier frequency, and reducing radio wave propagation loss. BF is a technique of controlling (also referred to as precoding) an amplitude and/or a phase of a signal transmitted/received to and from each element by using, for example, a super multi-element antenna and forming a beam (antenna directionality). In addition, Multiple Input Multiple Output (MIMO) that uses such a super multi-element antenna is also referred to as massive MIMO.

BF can be classified into digital BF and analog BF. Digital BF is a method for performing precoding signal processing (on a digital signal) on a baseband. In this case, parallel processing of Inverse Fast Fourier Transform (IFFT)/Digital to Analog Converter (DAC)/Radio Frequency (RF) needs to be performed a number of times corresponding to the number of antenna ports (or RF chains). On the other hand, digital BF can form a number of beams corresponding to the number of RF chains at optional timings.

Analog BF is a method for using a phase shifter on the RF. Analog BF cannot form a plurality of beams at the same timing, yet only rotate the phase of an RF signal and therefore can be configured easily and realized cheaply.

In addition, it is also possible to realize a hybrid BF configuration that is a combination of digital BF and analog BF. It is considered for NR to introduce massive MIMO. However, forming an enormous number of beams only by digital BF makes a circuit configuration costly. Hence, NR is assumed to use the hybrid BF configuration.

It is considered for NR to form transmission/reception beams both in a Base Station (a BS, a Transmission/Reception Point (TRP), or an eNode B (eNB) that may be also referred to as a gNB) and a UE and earn a gain.

A transmission beam and/or a reception beam may be determined based on channel information estimated by using a reference signal, for example. A reference signal may be a Cell-specific Reference Signal (CRS), a Channel State Information-Reference Signal (CSI-RS) and a Sounding Reference Signal (SRS) or an additionally defined reference signal (e.g., a Beam-specific Reference Signal (BRS) unique to a beam (different per beam)).

Channel information is information related to, for example, Channel State Information (CSI), channel characteristics and/or a channel matrix. In addition, the channel information may include transceiver characteristics of the UE and the gNB, and phase/amplitude adjustment results for beam formation. In this regard, the transceiver characteristics refer to, for example, frequency characteristics (e.g., the phase and/or amplitude characteristics) of the transceiver.

In addition, the channel information may be at least one of a Channel Quality Indicator (CQI), a Precoding Matrix Indicator (PMI), a Precoding Type Indicator (PTI) and a Rank Indicator (RI). In addition, the PMI determined by the gNB may be also referred to as a Transmitted PMI (TPMI).

The gNB may receive an uplink reference signal transmitted from the UE, perform channel estimation based on the uplink reference signal, and derive uplink and/or downlink channel information. The UE may receive the downlink reference signal transmitted by the gNB, perform channel estimation based on the downlink signal, and derive uplink and/or downlink channel information.

The gNB and the UE are preferably able to specify beams used by communicating parties. For example, the gNB and the UE may share information related to combinations (combinations of transmission beams on a transmission side and reception beams on a reception side) of transmission/reception beam pairs. In this case, the gNB may notify (instruct) the UE of the beam pair, and the UE may perform transmission by using the transmission beam (and/or reception by using the reception beam) associated with the notified beam pair. The combination of the transmission/reception beam pair may be referred to as a Beam Pair Link (BPL).

The information related to the combinations of the transmission/reception beam pairs may be notified to the UE and/or the gNB by using higher layer signaling (e.g., RRC signaling, Medium Access Control (MAC) signaling (e.g., an MAC Control Element (MAC CE) or broadcast information), physical layer signaling (e.g., Downlink Control Information (DCI)), Uplink Control Information (UCI) or a combination of these.

FIGS. 1A and 1B are diagrams illustrating one example of a beam pair. FIG. 1A illustrates one example of a transmission beam of the gNB and a reception beam of the UE, and FIG. 1B illustrates one example of a Beam Pair Index (BPI) indicating a combination of the transmission/reception beams in FIG. 1A. FIG. 1A illustrates three available transmission beams #0 to #2 (associated with transmission beam (TX beam) indices #0 to #2) of the gNB, and three available reception beams #0 to #2 (associated with reception beam (Rx) indices #0 to #2) of the UE.

In FIG. 1B, pairs of the transmission beam indices of the gNB and the reception beam indices of the UE illustrated in FIG. 1A are associated with BPIs #0 to #8, respectively. In addition, all pairs of available transmission/reception beams may not be able to be specified based on the BPIs.

The UE and/or the gNB may hold channel information associated with each BPI illustrated in FIG. 1B, and a transmission beam and/or a reception beam to be used may be decided based on the channel information associated with each BPI. For example, the channel information associated with each BPI may be obtained by beam sweeping of the UE and the gNB. According to beam sweeping, a plurality of beams (e.g., a plurality of beams of different directionality) are switched between and transmitted in different time domains and/or different frequency domains.

A signal and/or a channel transmitted by sweeping may be an optional signal, and may be at least one of, for example, a reference signal, a synchronization signal, a random access preamble, a control signal and a data signal or a combination of these. Furthermore, the signal and/or the channel transmitted by each beam may be the same or different per beam.

In addition, in this description, beams are distinguished (a difference between a plurality of beams is decided) based on at least one of following (1) to (8), yet are not limited to these. (1) resources (e.g., time and/or frequency resources and the number of resources), (2) antenna ports (e.g., port numbers of a DeModulation Reference Signal (DMRS) and/or a Sounding Reference Signal (SRS), the number of ports, and resources associated with the ports), (3) precoding (e.g., whether or not precoding is performed and a precoding weight), (4) transmission power, (5) phase rotation, (6) a beam width, (7) a beam angle (e.g., tilt angle) and (8) the number of layers.

Furthermore, a term "beam" used in this description may be used compatibly with at least one of above (1) to (8), and, for example, the "beam" may be read as a "resource", an "antenna port", a "DMRS port", an "SRS port" or a "reference signal antenna port". Furthermore, the "beam" may be read as a "transmission beam and/or a reception beam".

DMRS ports may be antenna ports of DeModulation Reference Signals (DMRS) of DL signals (e.g., a DL data channel and/or a DL control channel), and uniquely associated with beams. In addition, at least one of a DMRS sequence, and a frequency resource, a time resource and a code resource (e.g., Orthogonal Cover Code (OCC) and/or Cyclic Shift (CS)) on which the DMRS is arranged may be different at a different DMRS port.

SRS ports may be, for example, ports of an SRS used for UL channel measurement, and uniquely associated with beams. The UE may be configured to use different transmission beams per reference signal (e.g., a DMRS or an SRS) resource, or may use the same transmission beams at a plurality of ports for one reference signal resource.

Information of a combination of a resource and a port of a reference signal (e.g., the DMRS or the SRS) may be configured to the UE. Furthermore, information of the reference signal resource (e.g., the frequency resource (a density in a frequency direction) and a time resource (the number of symbols, a timing and a period) may be configured to the UE.

In addition, the reference signal in this description may be transmitted and/or received based on the same configuration (setting) as that of a reference signal of the same name according to existing LTE (LTE Rel. 13) or may be transmitted and/or received based on a different configuration. Furthermore, the DMRS or the SRS may be referred to as an NR-DMRS and an NR SRS, for example.

The beams may be identified based on different directionality (precoding matrix) applied to the same reference signal (e.g., the DMRS or the SRS). The beams may be specified based on a Beam Index (BI), a PMI, a TPMI, a port index of a predetermined reference signal (e.g., a DMRS Port Index (DPI) and an SRS Port Index (SPI)), and a resource index of a predetermined reference signal (e.g., a CSI-RS Resource Indicator (CRI), a DMRS Resource Index (DRI), and an SRS Resource Index (SRI)).

The UE may be notified of information (e.g., a beam index or a TPMI) related to the transmission beam and/or the reception beam from the gNB. The UE may autonomously determine a transmission beam and/or a reception beam to be used.

Whether or not the UE can autonomously determine a beam may be decided based on beam correspondence related information. A beam correspondence may be an index related to a match of a transmission beam and a reception beam, or may be referred to as a transmission/reception beam correspondence (Tx/Rx beam correspondence), a beam reciprocity, beam calibration, Calibrated/Non-calibrated, reciprocity calibrated/non-calibrated, the degree of correspondence or the degree of match or simply as a correspondence.

When, for example, a first beam (e.g., transmission beam) and a second beam (e.g., reception beam) completely match, a presence/absence of the correspondence may be decided as "present". When a difference between the both beams is a predetermined threshold or within an allowable range, the presence/absence of the correspondence may be decided as "present". Furthermore, the degree of correspondence may be a value calculated from the difference between the both beams. In addition, the difference between beams may be a difference obtained from beam specifying information, and may be at least one of, for example, a difference between beam indices, a difference between beam coefficients or a difference between beam angles.

When the UE has the correspondence, the gNB and/or the UE may assume that following (1) and/or (2) are satisfied: (1) The UE can determine a transmission beam of the UE for uplink transmission based on downlink measurement of the UE that uses one or more reception beams. (2) The UE can determine a reception beam of the UE for downlink reception based on an instruction of the BS based on uplink measurement of the BS that uses one or more transmission beams.

Furthermore, when the gNB has the correspondence, the gNB and/or the UE may assume that following (3) and/or (4) are satisfied: (3) The gNB can determine a reception beam of the BS for uplink reception based on downlink measurement of the UE that uses one or more transmission beams. (4) The gNB can determine a transmission beam of the BS for downlink transmission based on uplink measurement of the BS that uses one or more reception beams.

By the way, the existing LTE systems (e.g., LTE Rel. 8 to 13) do not take into account whether or not a beam is applied during measurement. For example, when calculating received quality (e.g., Reference Signal Received Power (RSRP)), the UE does not take application of a reception beam into account, and the RSRP is calculated at an antenna connector of the UE.

On the other hand, NR is likely to apply beam forming to all physical signals and physical channels during, for example, communication in a high frequency band. Therefore, a measurement result based on an existing measurement method that assumes non-directionality (that does not take the reception beam into account) is likely to significantly differ from communication quality of an actual physical signal and/or physical channel. Hence, when the UE reports a measurement result based on the existing measurement method, and the base station uses the measurement result for control, there is a risk of deterioration of a communication throughput and/or communication quality.

Hence, the inventors have arrived at an idea of reporting from the UE to the base station a measurement report measured and/or calculated by taking the reception beam into account. According to one aspect of the present invention, even when the UE applies a reception beam, it is possible to eliminate (or decrease) a difference between a measurement result and actual communication quality by reporting a measurement report associated with the reception beam, and prevent deterioration of the communication quality.

Furthermore, according to another aspect of the present invention, by reporting a measurement report corresponding to a case where a reception beam is not taken into account (non-directionality) in addition to a measurement report that takes a predetermined reception beam into account, it is possible to appropriately control a cell design (handover and a configuration of an SCell).

Embodiments according to the present invention will be described in detail below with reference to the drawings. The configuration according to each embodiment may be applied alone or may be applied in combination.

In addition, in this description, "measurement" relates to measurement of at least one of received quality such as Reference Signal Received Power (RSRP), Reference Signal Received Quality (RSRQ), a Received Signal Strength Indicator (RSSI), a Signal to Noise Ratio (SNR), and a Signal to Interference plus Noise Ratio (SINR). Although this description supposes measurement of RSRP below unless specified in particular, contents of the description is not limited to this. The "RSRP" may be read as RSRQ, an RSSI, an SNR, an SINR or other indices related to power and/or quality.

Furthermore, the following description assumes a case where a predetermined reference signal (e.g., CSI-RS) is used as the DL signal to control measurement. However, the DL signal that is available for measurement is not limited to this. According to measurement, another signal and/or channel (e.g., at least one of a synchronization signal (a PSS and/or an SSS), a broadcast channel (PBCH), a DeModulation Reference Signal (DM-RS), a Mobility Reference Signal (MRS) and a Cell-specific Reference Signal (CRS)) can be also used. Furthermore, measurement on downlink will be described in the following description. However, an uplink signal and/or channel can be used and applied on uplink, too.

Furthermore, measurement (L3 measurement) that is used for processing of a layer 3 (e.g., handover) and/or measurement (L1 measurement) that is used for processing of a layer 1 (L1/L2) can be applied as measurement in the following description.

First Embodiment

According to the first embodiment, a UE performs measurement (e.g., measurement and/or calculation of RSRP) that takes at least a reception beam (Rx beam) into account, and reports a measurement report to a base station (gNB). The RSRP for which the reception beam has been applied (taken into account) may be referred to as directional RSRP, and the RSRP for which the reception beam is not applied (taken into account) may be referred to as non-directional RSRP.

The measurement report associated with the reception beam is reported based on a measurement result (directional RSRP) of a DL signal received by applying a predetermined reception beam. Alternatively, directional RSRP may be calculated by taking a predetermined beam gain into account for a measurement result (non-directional RSRP) of the DL signal received without applying the reception beam, and the measurement report may be reported.

Application of Reception Beam

The UE applies a predetermined reception beam to the DL signal transmitted from the base station and measures received quality (e.g., directional RSRP). The UE may calculate the directional RSRP (1) based on an autonomously determined reception beam (see FIG. 2A) or (2) based on a reception beam designated by the base station (see FIG. 2B).

Figure 2A:
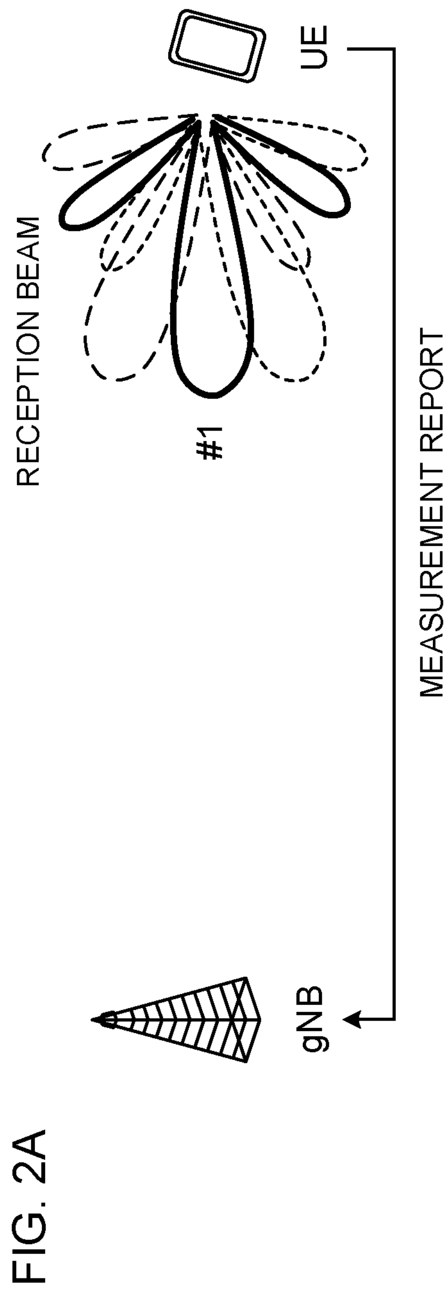
FIGS. 2A and 2B are diagrams illustrating one example of a measurement report associated with a reception beam.

FIG. 2A illustrates that the UE autonomously determines a predetermined reception beam (#1 in this case) from a plurality of reception beams (#0 to #2). The reception beam autonomously determined by the UE is not limited to one, and a plurality of reception beams may be selected. Furthermore, the UE may select reception beams based on the RSRP. For example, the UE selects the reception beam that maximizes the RSRP or selects a predetermined number of reception beams in order of higher RSRP.

Figure 2B:
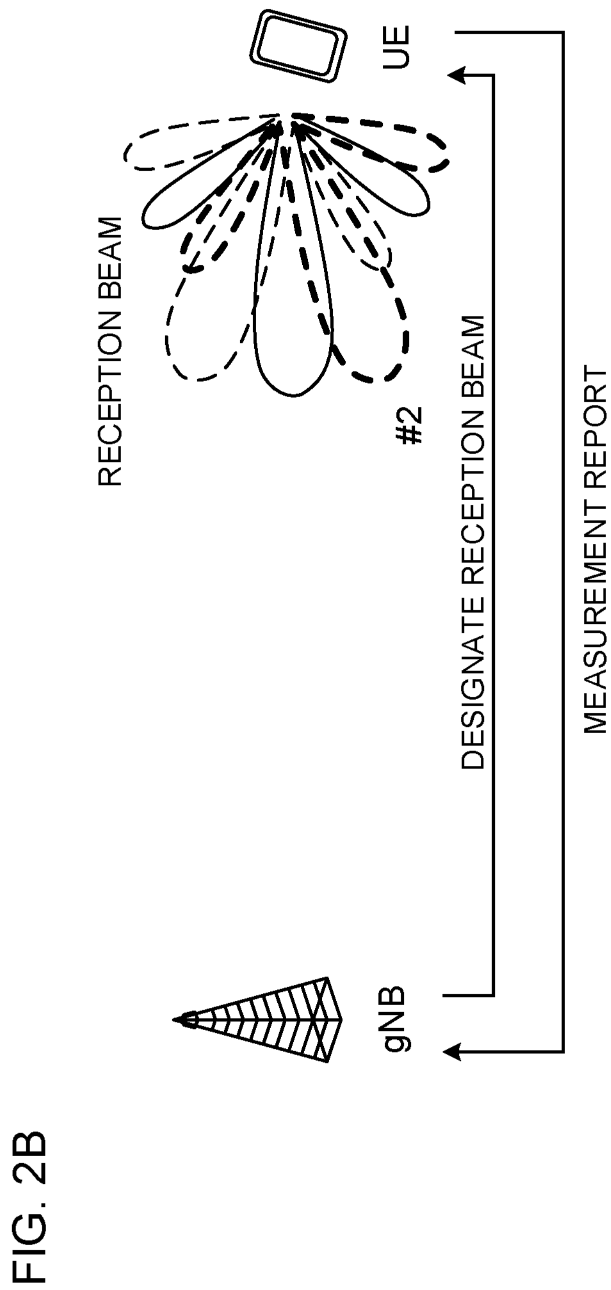

FIG. 2B illustrates that the UE determines a reception beam (#2 in this case) based on information notified from the base station. For example, the UE applies the reception beam notified by a PMI (TPMI) determined by a radio base station, and performs measurement (measurement and/or calculation of directional RSRP).

Furthermore, when the UE has a beam correspondence (there is the beam correspondence), the UE may determine the reception beam based on a beam index and/or a resource notified from the base station in response to UL transmission of the UE. When, for example, there is the beam correspondence, the UE performs SRS sweeping after beam forming, then determines the reception beam based on the beam index or an SRS Resource Index (SRI) notified by the base station, and performs measurement.

Furthermore, the UE may switch between above (1) and above (2) and calculate directional RSRP. When, for example, a beam determination right is switched between the base station and the UE, a method for determining a reception beam used for measurement is controlled according to the beam determination right. When, for example, the UE side has the beam determination right of a specific channel (e.g., a PDSCH and/or a PUSCH), the UE autonomously determines the reception beam and reports a measurement report. On the other hand, when the base station side has the beam determination right of the specific channel, the UE determines a reception beam based on information notified from the base station, and reports a measurement report.

Naturally, irrespectively of whether or not there is the beam determination right, the UE may autonomously determine a reception beam and control measurement at all times or determine a reception beam based on notification information from the base station and control measurement at all times.

By reporting the measurement report (e.g., directional RSRP) by taking the reception beam into account in this way, the base station can obtain a measurement result that reflects an actual signal and/or channel communication quality. Consequently, when a reception beam is applied to perform communication, it is possible to prevent deterioration of communication quality.

Non-Application of Reception Beam

The UE may measure received quality (e.g., non-directional RSRP) without applying a reception beam to a DL signal transmitted from the base station, and calculate directional RSRP by using the non-directional RSRP.

In this case, the UE may measure only non-directional RSRP without applying the reception beam, calculate the directional RSRP by using a predetermined correction value, and report the directional RSRP as a measurement report associated with the predetermined reception beam. For example, the UE may use directional RSRP obtained by adding (or subtracting) a directional beam gain calculated in advance from the measured non-directional RSRP.

Consequently, the UE can report the directional RSRP to the base station when a reception beam is not applied (a non-directional beam is applied), too.

Use of Beam Pairing

Furthermore, measurement may be controlled by taking a transmission beam (base station side) into account. For example, the UE may perform measurement (measurement and/or calculation of RSRP) per combination (BPL) of a transmission beam and a reception beam. For example, the UE measures and/or calculates received quality (directional RSRP) associated with one or a plurality of BPLs from a plurality of preset BPLs (see FIG. 1), and reports a measurement result as a measurement report.

Figure 3A:
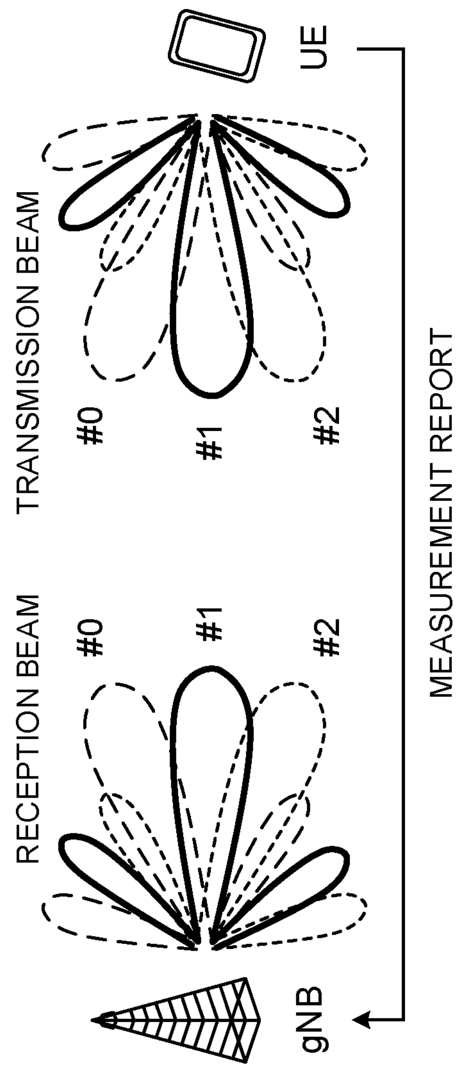
FIGS. 3A and 3B are diagrams illustrating one example of a measurement report associated with a BPL.
Figure 3B:
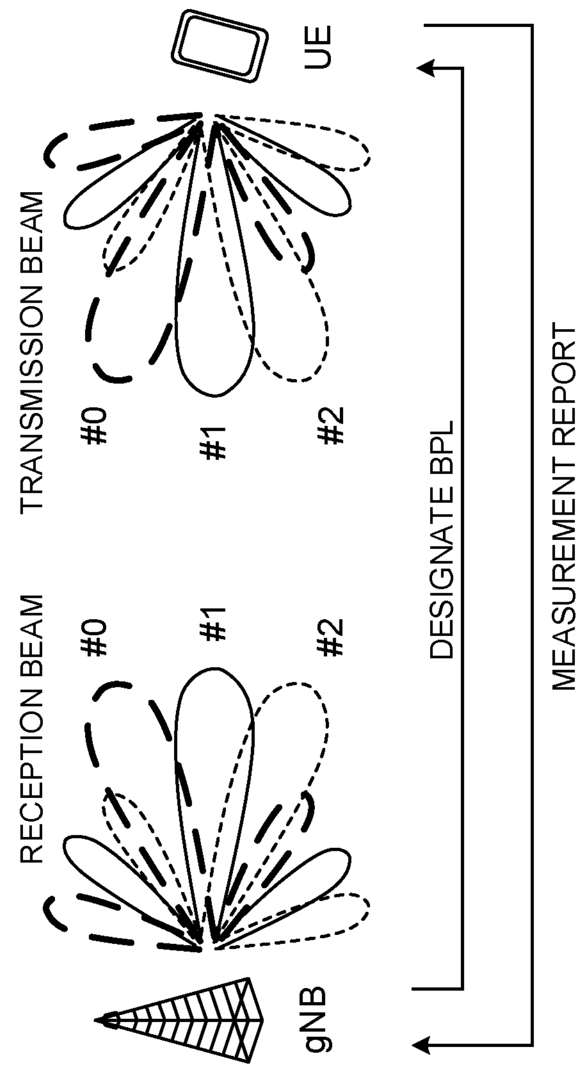

The BPL used for measurement may be autonomously determined by the UE (see FIG. 3A) or may be determined based on information notified from the base station (see FIG. 3B). FIG. 3A illustrates that the UE autonomously selects a predetermined BPL (a BPL #4 associated with a combination of the transmission beam #1 and the reception beam #1 in this case) to perform measurement. FIG. 3B illustrates that the UE performs measurement based on the predetermined BPL (a BPL #0 associated with a combination of the transmission beam #0 and the reception beam #0 in this case) notified from the base station. In addition, when the BPL is used, the above-described reception beam may be replaced with the BPL and the BPL may be applied.

It is considered for NR to use beam forming (BF) for both of transmission and reception, and control uplink transmission power per BPL. Consequently, by performing measurement per BPL (in units of BPLs), it is possible to estimate path loss per BPL. Consequently, by performing measurement by taking the BPL into account, the base station and/or the UE can appropriately control uplink transmission power per BPL.

Second Embodiment

There is also considered a case where, when a reception beam is applied to perform communication, RSRP differs per UE depending on a difference in a beam gain of the UE even at the same place (location). Hence, when the UE reports to a base station only directional RSRP to which a reception beam is applied, contents of a measurement report is insufficient for the base station from a viewpoint of a cell design in some cases. In this regard, the cell design refers to at least one of HandOver (HO), addition/change/deletion of a Secondary Cell (SCell) and parameter optimization.

Furthermore, there is also considered a case where, when a NetWork (NW) is operated in a plurality of frequency bands (e.g., CA and/or DC), RSRP (non-directional RSRP or directional RSRP) that is necessary per frequency band differs. For example, it is considered that non-directional RSRP is used to control communication in a low frequency band (e.g., 6 GHz or less), and at least directional RSRP is used to control communication in a high frequency band. In this case, when non-directional RSRP and directional RSRP are simply compared and communication is controlled, there is a risk of deterioration of communication quality.

Hence, according to the second embodiment of the present invention, the UE reports to the base station a measurement report (e.g., directional RSRP) that takes a reception beam (Rx beam) into account and, in addition, a measurement report (e.g., non-directional RSRP) that does not take a reception beam into account. In this case, the UE performs measurement to which a reception beam is applied and/or measurement to which a reception beam is not applied to report information related to the direction RSRP and the non-directional RSRP.

For example, the UE may receive a DL signal by applying a predetermined reception beam and calculate the directional RSRP, and receive a DL signal without applying a reception beam and calculate the non-directional RSRP. In this case, the UE performs both of reception of the DL signal by applying the reception beam and reception of the DL signal without applying the reception beam. A method for determining a reception beam (or the directional RSRP) to be applied can use the configuration described in the above first embodiment.

Alternatively, the UE may measure only one of the directional RSRP and the non-directional RSRP, and calculate the other RSRP by using a correction value prepared in advance. For example, the UE may receive the DL signal without applying the reception beam, measure only the non-directional RSRP, and calculate the directional RSRP by using a predetermined correction value. In this case, the UE reports to the base station the measured non-directional RSRP and the directional RSRP calculated based on the non-directional RSRP and the correction value as a measurement report. The UE may obtain the directional RSRP by adding or subtracting a correction value that takes into account a directional beam gain calculated in advance to or from the non-directional RSRP.

Alternatively, the UE may receive the DL signal by applying the reception beam, measure only the directional RSRP, and calculate the non-directional RSRP by using a predetermined correction value. In this case, the UE reports to the base station the measured directional RSRP and the non-directional RSRP calculated based on the directional RSRP and correction value as a measurement report. The UE may obtain the non-directional RSRP by adding or subtracting a correction value that takes into account a directional beam gain calculated in advance to or from the directional RSRP.

Thus, according to the second embodiment, the directional RSRP associated with a predetermined reception beam, and, in addition, the non-directional RSRP in a case where the reception beam is not applied are reported as the measurement reports to the base station. According to this configuration, even when RSRP differs per UE due to a difference in a beam gain of the UE, the base station can appropriately learn received quality based on the directional RSRP and the non-directional RSRP, and appropriately control a cell design.

Furthermore, even when a NetWork (NW) is operated in a plurality of frequency bands, the base station can appropriately control communication based on RSRP that is necessary per frequency band by reporting the directional RSRP and the non-directional RSRP from the UE to the base station.

In addition, the base station may switch and control whether or not to apply a reception beam per frequency band (e.g., whether or not to report the non-directional RSRP and the directional RSRP). For example, the base station may instruct the UE not to apply a directional beam (or report non-directional RSRP) in a predetermined frequency band (low frequency band), and instruct the UE to apply a directional beam (or report directional RSRP) in another frequency band (high frequency band). The base station may make an instruction to the UE by using higher layer signaling (e.g., RRC signaling or broadcast (system) information).

Alternatively, whether or not to apply a reception beam during measurement may be defined in advance by a specification. For example, it is defined not to apply a directional beam (or report non-directional RSRP) in a predetermined frequency band (low frequency band), and to apply a directional beam (or report directional RSRP) in another frequency band (high frequency band). Furthermore, a reception beam during measurement may be controlled according to whether or not to apply a reception beam on a specific channel (e.g., a PDSCH and/or a PDCCH).

Third Embodiment

The third embodiment will describe a selection method of a user terminal for selecting an antenna port (port) and/or an antenna panel (panel) used for reception and/or measurement.

The Antenna Port (AP) can be defined as a virtual antenna terminal that maps a channel or a signal sent on the same channel. When Multi-Input Multi-Output (MIMO) is applied, and the number of transmission layers of data is n, signals (e.g., RSs) having different antenna port numbers are mapped on n layers. A reception side can perform channel estimation on each of the n layers by using the RSs having n different antenna port numbers, and demodulate a received signal by using a channel estimation result of each layer. In addition, the antenna port may be also referred to as a beam index when beam forming is used.

The antenna panel (Panel) may be composed of a plurality of antenna elements. For example, an ultra-multi element antenna may be used to realize massive Multiple Input Multiple Output (MIMO). By controlling the amplitude and/or the phase of a signal transmitted/received from each element of the ultra-multi element antenna, it is possible to form a beam (antenna directionality). The antenna panel may be also referred to as an antenna port group or a Transceiver Unit (TXRU) configuration.

A port and/or a panel (referred to as a "port/panel" below) applied to reception and/or measurement of the DL signal by the UE may be notified from a radio base station to the UE or may be autonomously determined by the UE.

When notifying the UE of information related to an index of the port/panel, the base station can notify the information by using higher layer signaling (e.g., RRC signaling and/or broadcast information). The UE performs measurement based on the index of the port/panel notified from the base station.

Alternatively, when there is a beam correspondence, the base station may notify the UE of information related to an SRS resource. For example, the base station may select the SRS resource associated with a predetermined port/panel based on SRS sweeping performed by the UE, and notify the UE of the SRS resource. The UE performs measurement based on the index of the port/panel related to the SRS resource notified from the base station. The SRS resource may be associated with an index of a predetermined reception beam.

The UE may autonomously select a predetermined port/panel and control measurement. For example, the UE selects the port/panel that maximizes RSRP. Furthermore, the UE may select a plurality of ports/panels. In this case, the UE may select a combination of a predetermined port/panel based on an RSRP value.

Furthermore, the UE may switch between a method for notifying a port/panel from the radio base station and an autonomous determination method of the UE, and control measurement. When, for example, a beam determination right is switched between the base station and the UE, a method for determining a port/panel used for measurement is controlled according to the beam determination right. In this case, when the UE side has the beam determination right of a specific channel (e.g., a PDSCH and/or a PUSCH), the UE autonomously determines the port/panel and performs measurement. On the other hand, when the base station side has the beam determination right of the specific channel, the UE performs measurement based on index information of the port/panel notified from the base station.

Alternatively, a port/panel applied by the UE may be defined in advance by a specification. For example, a port/panel used for measurement by the UE may be a specific port/panel index. Furthermore, there may be a configuration to select the same port/panel during measurement according to the port/panel used for reception on a specific channel (e.g., a PDSCH and/or a PDCCH).

Thus, the third embodiment clearly defines the port/panel applied during measurement. In addition, existing LTE systems have a risk that a certain port (e.g., R0) and, in addition, another port (e.g., R1) are defined available, and an RSRP value differs depending on an R1 utilizing method (e.g., averaging or selection and synthesis of R0 and R1). Consequently, according to the configuration described in the third embodiment, the base station can precisely learn RSRP of each port/panel, and appropriately control communication based on a measurement report.

Fourth Embodiment

The fourth embodiment will describe a method for reporting a measurement report (e.g., RSRP) from a UE.

The UE reports RSRP associated with at least a given reception beam (and a port/panel). When measuring and/or calculating a plurality of RSRP, the UE may report part of RSRP of a plurality of RSRP. For example, the UE reports RSRP (maximum RSRP) associated with a reception beam from which maximum RSRP is obtained and/or a port/panel. Furthermore, the UE may report M RSRP in order from a higher value.

Alternatively, the UE may report RSRP (minimum RSRP) associated with a reception beam from which minimum RSRP is obtained and/or a port/panel. Furthermore, the UE may report N RSRP in order from a lower value. By reporting the RSRP of low values, the base station can learn a lower limit value of the RSRP in a case where a beam has to be changed due to blocking.

Furthermore, the UE may report both of the maximum RSRP and the minimum RSRP. Alternatively, the UE may report one of the maximum RSRP and the minimum RSRP and a difference between the maximum RSRP and the minimum RSRP.

Furthermore, when reporting a measurement report (e.g., RSRP), the UE may report information related to a used reception beam (reception beam related information). For example, the UE reports at least one of (or a combination of some of) a port index, a panel index, an SRS resource index, a beam gain, a TPMI, a reception beam index and a beam pair index as reception beam related information.

The reception beam related information may be reported as a measurement report together with the RSRP, or may be reported separately from the RSRP. Furthermore, to support a plurality of RSRP, information indicating an association with a plurality of RSRP may be reported.

Thus, by reporting the RSRP and, in addition, related information of an applied reception beam to the base station, the base station side can learn details of each RSRP status and appropriately control communication. In addition, the number of RSRP reported by the UE and/or contents of related information may be notified from the base station to the UE by higher layer signaling or defined in advance by a specification.

Radio Communication System

The configuration of the radio communication system according to one embodiment of the present invention will be described below. This radio communication system uses one or a combination of the radio communication methods according to each of the above embodiments of the present invention to perform communication.

Figure 4:
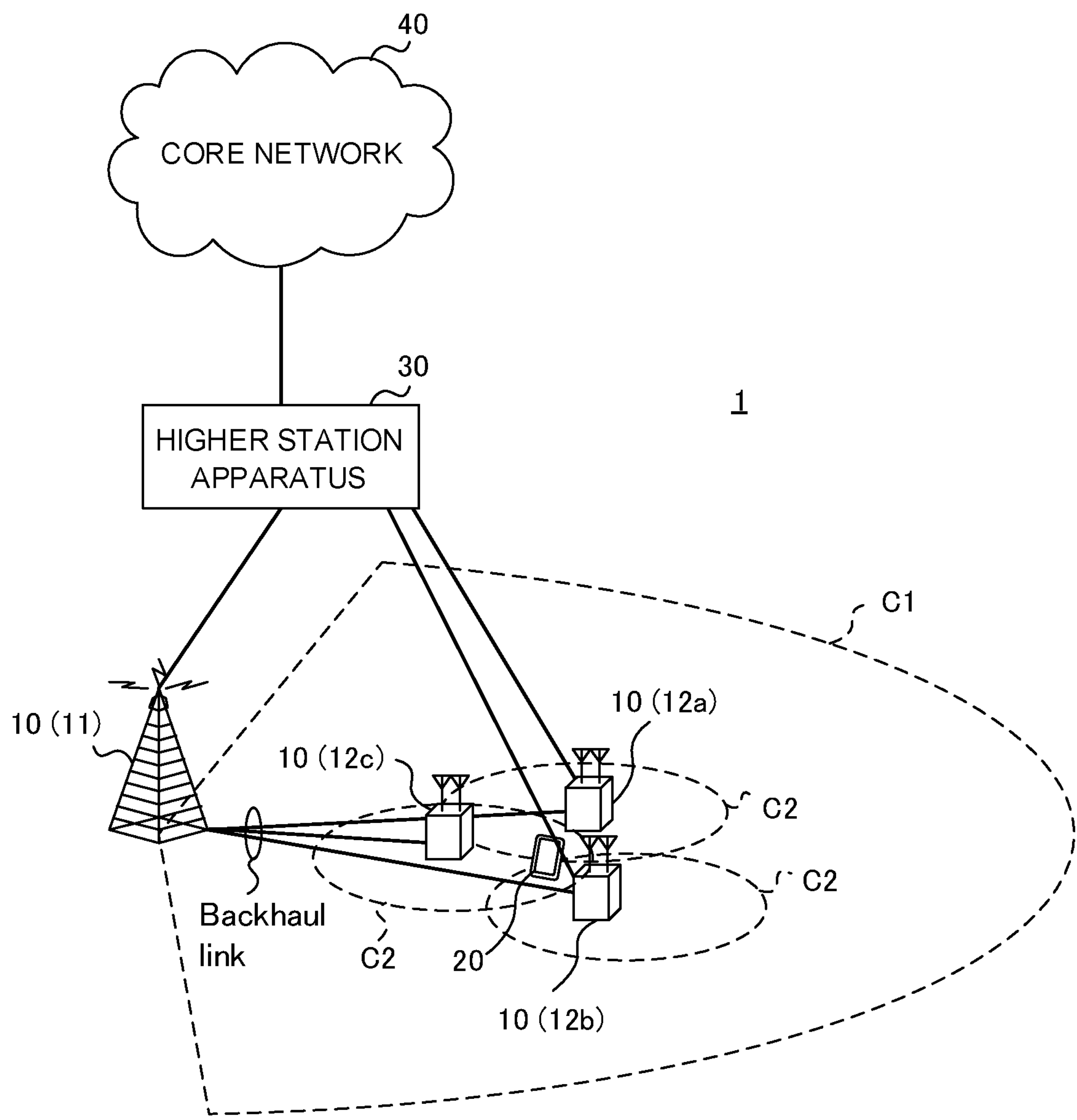
FIG. 4 is a diagram illustrating one example of a schematic configuration of a radio communication system according to one embodiment of the present invention.

FIG. 4 is a diagram illustrating one example of a schematic configuration of the radio communication system according to the one embodiment of the present invention. A radio communication system 1 can apply Carrier Aggregation (CA) that aggregates a plurality of base frequency blocks (component carriers) whose one unit is a system bandwidth (e.g., 20 MHz) of the LTE system, and/or Dual Connectivity (DC).

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA) and New Radio Access Technology (New-RAT), or a system that realizes these techniques.

The radio communication system 1 includes a radio base station 11 that forms a macro cell C1 of a relatively wide coverage, and radio base stations 12 (12*a* to 12*c*) that are located in the macro cell C1 and form small cells C2 narrower than the macro cell C1. Furthermore, a user terminal 20 is located in the macro cell C1 and each small cell C2. An arrangement and the number of each cell and the user terminals 20 are not limited to those illustrated in FIG. 4.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (an existing carrier that is also referred to as a legacy carrier) of a narrow bandwidth in a relatively low frequency band (e.g., 2 GHz). Meanwhile, the user terminal 20 and each radio base station 12 may use a carrier of a wide bandwidth in a relatively high frequency band (e.g., 3.5 GHz or 5 GHz) or may use the same carrier as that used by the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are respectively connected with a higher station apparatus 30 and are connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or continuous resource blocks per terminal and causes a plurality of terminals to use different bands to reduce an interference between the terminals. In this regard, uplink and downlink radio access schemes are not limited to a combination of these and may be other radio access schemes.

The radio communication system 1 uses as downlink channels a downlink shared channel (PDSCH: Physical Downlink Shared Channel) shared by each user terminal 20, a broadcast channel (PBCH: Physical Broadcast Channel) and a downlink L1/L2 control channel. User data, higher layer control information and System Information Blocks (SIB) are transmitted on the PDSCH. Furthermore, Master Information Blocks (MIB) are transmitted on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH) and a Physical Hybrid-ARQ Indicator Channel (PHICH). Downlink Control Information (DCI) including scheduling information of the PDSCH and the PUSCH is transmitted on the PDCCH. The number of OFDM symbols used for the PDCCH is transmitted on the PCFICH. Transmission acknowledgement information (also referred to as, for example, retransmission control information, HARQ-ACK or ACK/NACK) of a Hybrid Automatic Repeat reQuest (HARQ) for the PUSCH is transmitted on the PHICH. The EPDCCH is subjected to frequency division multiplexing with the PDSCH (downlink shared data channel) and is used to transmit DCI similar to the PDCCH.

The radio communication system 1 uses as uplink channels an uplink shared channel (PUSCH: Physical Uplink Shared Channel) shared by each user terminal 20, an uplink control channel (PUCCH: Physical Uplink Control Channel), and a random access channel (PRACH: Physical Random Access Channel). User data and higher layer control information are transmitted on the PUSCH. Furthermore, downlink radio quality information (CQI: Channel Quality Indicator) and transmission acknowledgement information are transmitted on the PUCCH. A random access preamble for establishing connection with cells is transmitted on the PRACH.

The radio communication system 1 transmits as downlink reference signals a Cell-specific Reference Signal (CRS), a Channel State Information-Reference Signal (CSI-RS), a DeModulation Reference Signal (DMRS) and a Positioning Reference Signal (PRS). Furthermore, the radio communication system 1 transmits a Sounding Reference Signal (SRS) and a DeModulation Reference Signal (DMRS) as uplink reference signals. In this regard, the DMRS may be also referred to as a user terminal specific reference signal (UE-specific Reference Signal). Furthermore, a reference signal to be transmitted is not limited to these.

Radio Base Station

Figure 5:
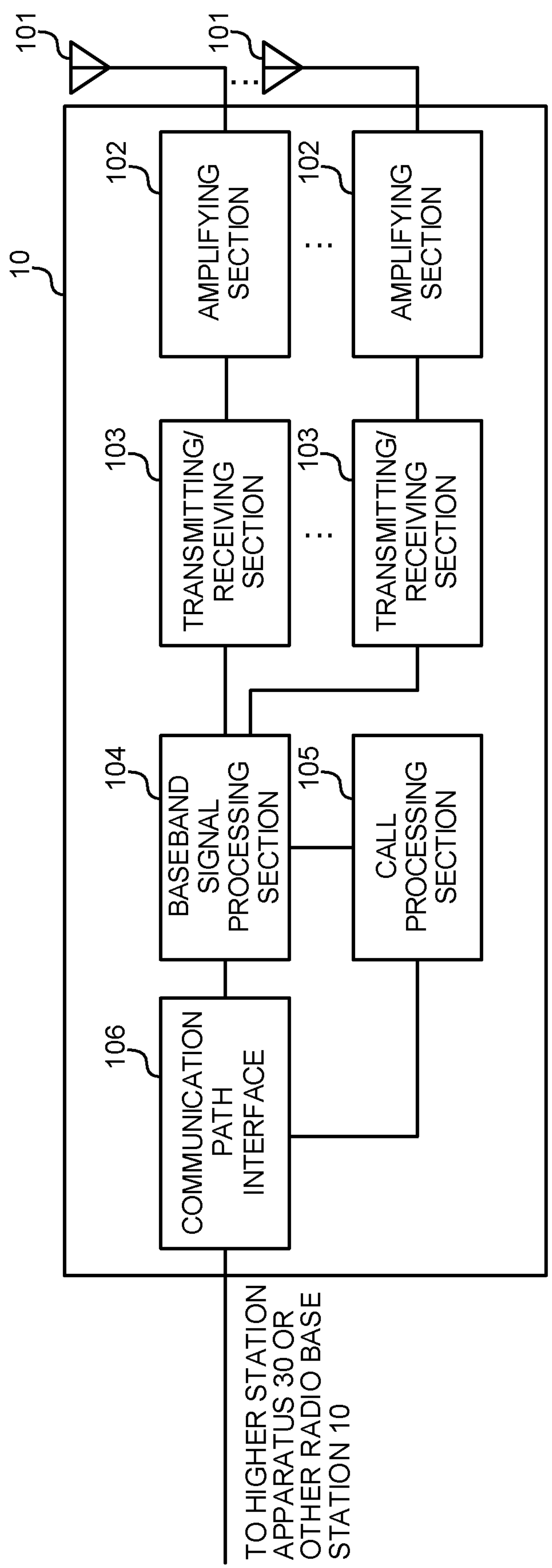
FIG. 5 is a diagram illustrating one example of an entire configuration of a radio base station according to one embodiment of the present invention.

FIG. 5 is a diagram illustrating one example of an entire configuration of the radio base station according to the one embodiment of the present invention. The radio base station 10 includes pluralities of transmitting/receiving antennas 101, amplifying sections 102 and transmitting/receiving sections 103, a baseband signal processing section 104, a call processing section 105 and a channel interface 106. In this regard, the radio base station 10 only needs to be configured to include one or more of each of the transmitting/receiving antennas 101, the amplifying sections 102 and the transmitting/receiving sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP)

layer, segmentation and concatenation of the user data, transmission processing of an RLC layer such as Radio Link Control (RLC) retransmission control, Medium Access Control (MAC) retransmission control (such as HARQ transmission processing), and transmission processing such as scheduling, transmission format selection, channel coding, Inverse Fast Fourier Transform (IFFT) processing, and precoding processing on the user data to transfer to each transmitting/receiving section 103. Furthermore, the baseband signal processing section 104 performs transmission processing such as channel coding and inverse fast Fourier transform on a downlink control signal, too, to transfer to each transmitting/receiving section 103.

Each transmitting/receiving section 103 converts a baseband signal precoded and output per antenna from the baseband signal processing section 104 into a radio frequency band to transmit. The radio frequency signal subjected to frequency conversion by each transmitting/receiving section 103 is amplified by each amplifying section 102, and is transmitted from each transmitting/receiving antenna 101. The transmitting/receiving sections 103 can be composed of transmitters/receivers, transmitting/receiving circuits or transmitting/receiving apparatuses described based on a common knowledge in a technical field according to the present invention. In this regard, the transmitting/receiving sections 103 may be composed as an integrated transmitting/receiving section or may be composed of transmitting sections and receiving sections.

Meanwhile, each amplifying section 102 amplifies a radio frequency signal as an uplink signal received by each transmitting/receiving antenna 101. Each transmitting/receiving section 103 receives the uplink signal amplified by each amplifying section 102. Each transmitting/receiving section 103 performs frequency conversion on the received signal into a baseband signal to output to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal to transfer to the higher station apparatus 30 via the channel interface 106. The call processing section 105 performs call processing (configuration and release) of a communication channel, state management of the radio base station 10 and radio resource management.

The channel interface 106 transmits and receives signals to and from the higher station apparatus 30 via a predetermined interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

In addition, each transmitting/receiving section 103 may further include an analog beam forming section that performs analog beam forming. The analog beam forming section may be composed of an analog beam forming circuit (e.g., a phase shifter or a phase shift circuit) or an analog beam forming apparatus (e.g., a phase shifter) described based on the common knowledge in the technical field according to the present invention. Furthermore, each transmitting/receiving antenna 101 may be composed of an array antenna, for example.

Each transmitting/receiving section 103 may transmit a signal by using a transmission beam or receive a signal by using a reception beam.

Each transmitting/receiving section 103 transmits a DL signal (e.g., at least one of a CSI-RS, a synchronization signal (a PSS and/or an SSS), a broadcast channel (PBCH), a DeModulation Reference Signal (DM-RS), a Mobility Reference Signal (MRS) and a Cell-Specific Reference Signal (CRS)) used for measurement of the user terminal. Furthermore, each transmitting/receiving section 103 receives at least one of a measurement report (e.g., only directional RSRP or directional RSRP+non-directional RSRP), an antenna port/panel and reception beam related information transmitted from the user terminal.

Figure 6:
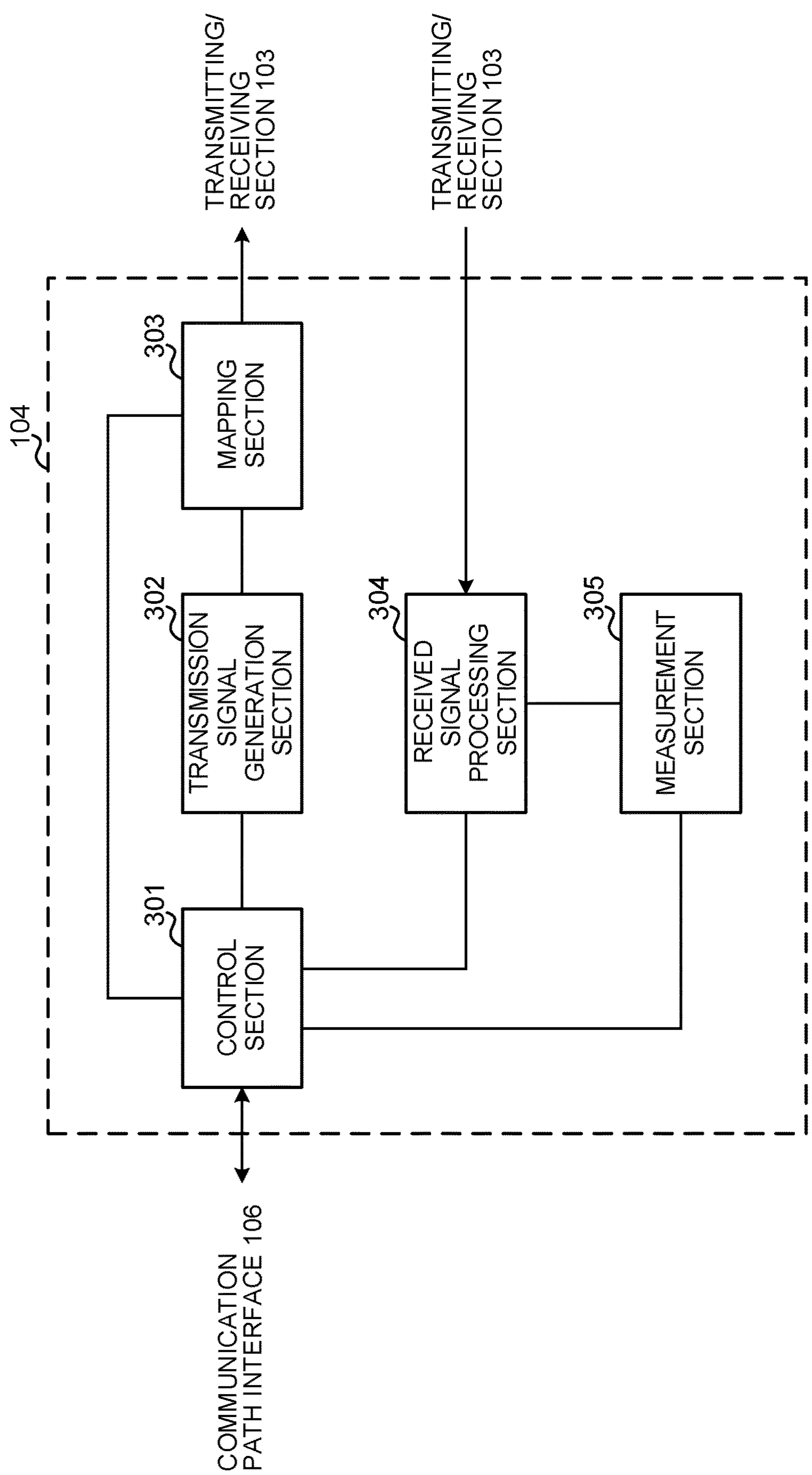
FIG. 6 is a diagram illustrating an example of a function configuration of the radio base station according to one embodiment of the present invention.

FIG. 6 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks that are necessary for radio communication, too.

The baseband signal processing section 104 includes at least a control section (scheduler) 301, a transmission signal generation section 302, a mapping section 303, a received signal processing section 304 and a measurement section 305. In addition, these components only need to be included in the radio base station 10, and part or all of the components do not necessarily need to be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generation section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal transmitted on the PDSCH), and a downlink control signal (e.g., a signal transmitted on the PDCCH and/or the EPDCCH such as transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal transmitted on the PUSCH), an uplink control signal (e.g., a signal transmitted on the PUCCH and/or the PUSCH such as transmission acknowledgement information), a random access preamble (e.g., a signal transmitted on the PRACH) and an uplink reference signal.

The control section 301 performs control to form a transmission beam and/or a reception beam by using digital BF (e.g., precoding) of the baseband signal processing section 104 and/or analog BF (e.g., phase rotation) of each transmitting/receiving section 103. The control section 301 may perform control to form a beam based on downlink channel information and uplink channel information. These pieces of channel information may be obtained from the received signal processing section 304 and/or the measurement section 305.

The transmission signal generation section 302 generates downlink signals (such as a downlink control signal, a downlink data signal and a downlink reference signal) based on an instruction from the control section 301 to output to the mapping section 303. The transmission signal generation section 302 can be composed of a signal generator, a signal generation circuit and a signal generation apparatus described based on the common knowledge in the technical field according to the present invention.

The transmission signal generation section 302 generates, for example, a DL assignment for notifying downlink signal allocation information, and a UL grant for notifying uplink signal allocation information based on the instruction from the control section 301. Furthermore, the transmission signal generation section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generation section 302, on a predetermined radio resource based on the instruction from the control section 301 to output to each transmitting/receiving section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal and an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) or Channel State Information (CSI) measurement based on the received signal. The measurement section 305 may measure received power (e.g., Reference Signal Received Power (RSRP)), received quality (e.g., Reference Signal Received Quality (RSRQ)) and a Signal to Interference plus Noise Ratio (SINR)), a signal strength (e.g., Received Signal Strength Indicator (RSSI)) or channel information (e.g., CSI). The measurement section 305 may output a measurement result to the control section 301.

User Terminal

Figure 7:
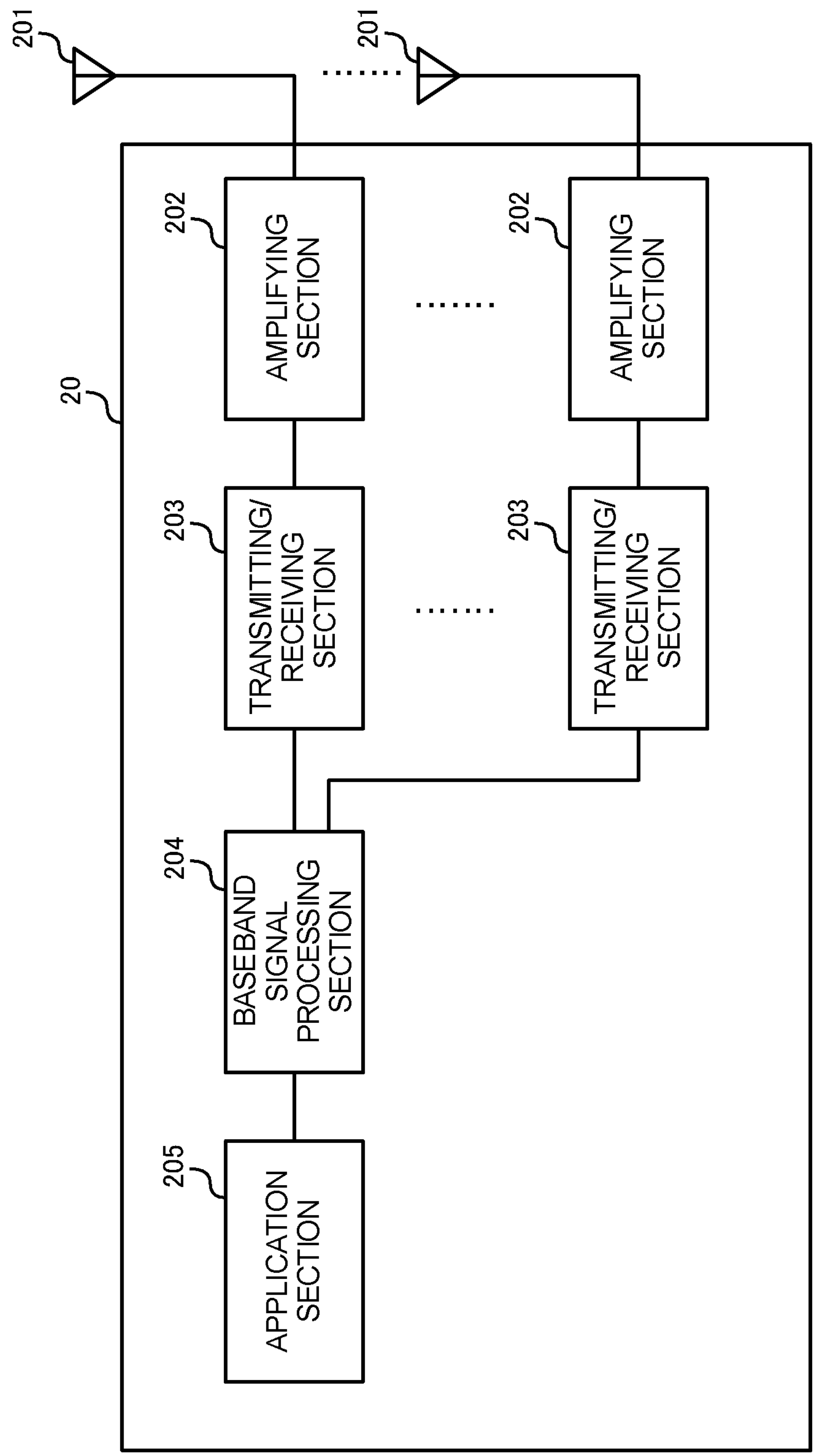
FIG. 7 is a diagram illustrating one example of an entire configuration of a user terminal according to one embodiment of the present invention.

FIG. 7 is a diagram illustrating one example of an entire configuration of the user terminal according to the one embodiment of the present invention. The user terminal 20 includes pluralities of transmitting/receiving antennas 201, amplifying sections 202 and transmitting/receiving sections 203, a baseband signal processing section 204 and an application section 205. In this regard, the user terminal 20 only needs to be configured to include one or more of each of the transmitting/receiving antennas 201, the amplifying sections 202 and the transmitting/receiving sections 203.

Each amplifying section 202 amplifies a radio frequency signal received at each transmitting/receiving antenna 201. Each transmitting/receiving section 203 receives a downlink signal amplified by each amplifying section 202. Each transmitting/receiving section 203 performs frequency conversion on the received signal into a baseband signal to output to the baseband signal processing section 204. The transmitting/receiving sections 203 can be composed of transmitters/receivers, transmitting/receiving circuits or transmitting/receiving apparatuses described based on the common knowledge in the technical field according to the present invention. In this regard, the transmitting/receiving sections 203 may be composed as an integrated transmitting/receiving section or may be composed of transmitting sections and receiving sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information among the downlink data, too, to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data to transfer to each transmitting/receiving section 203. Each transmitting/receiving section 203 converts the baseband signal output from the baseband signal processing section 204 into a radio frequency band to transmit. The radio frequency signal subjected to the frequency conversion by each transmitting/receiving section 203 is amplified by each amplifying section 202, and is transmitted from each transmitting/receiving antenna 201.

In addition, each transmitting/receiving section 203 may further include an analog beam forming section that performs analog beam forming. The analog beam forming section may be composed of an analog beam forming circuit (e.g., a phase shifter or a phase shift circuit) or an analog beam forming apparatus (e.g., a phase shifter) described based on the common knowledge in the technical field according to the present invention. Furthermore, each transmitting/receiving antenna 201 may be composed of an array antenna, for example.

Each transmitting/receiving section 203 may transmit a signal by using a transmission beam or receive a signal by using a reception beam. Each transmitting/receiving section 203 receives a DL signal (e.g., at least one of the CSI-RS, the synthesis signal (the PSS and/or the SSS), the broadcast channel (PBCH), the DeModulation Reference Signal (DM-RS), the Mobility Reference Signal (MRS) and the Cell-specific Reference Signal (CRS)) used for measurement. Furthermore, each transmitting/receiving section 203 transmits at least one of a measurement report (e.g., only directional RSRP or directional RSRP+non-directional RSRP), the antenna port/panel and the reception beam related information transmitted from the user terminal.

Figure 8:
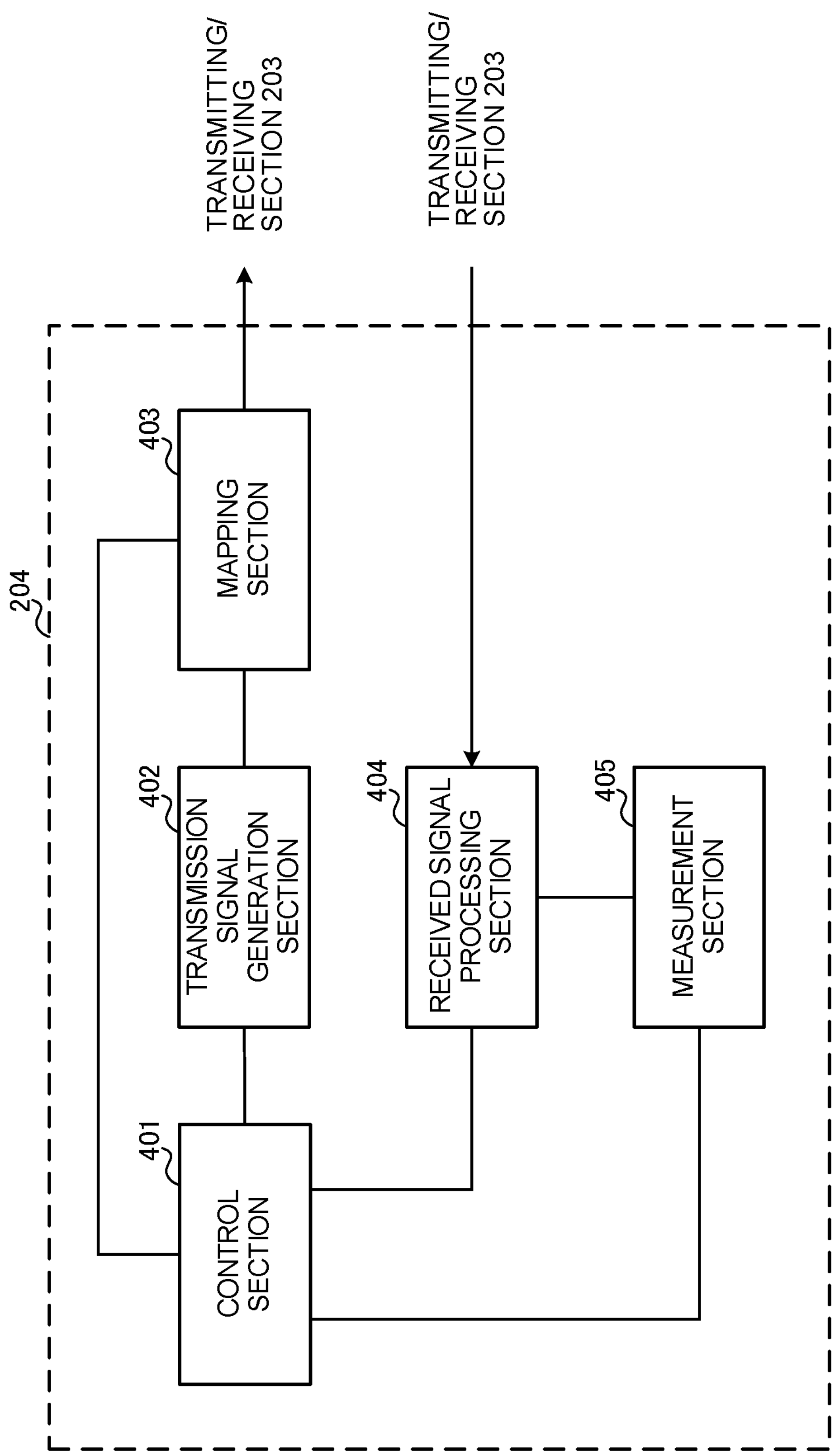
FIG. 8 is a diagram illustrating one example of a function configuration of the user terminal according to one embodiment of the present invention.

FIG. 8 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks that are necessary for radio communication, too.

The baseband signal processing section 204 of the user terminal 20 includes at least a control section 401, a transmission signal generation section 402, a mapping section 403, a received signal processing section 404 and a measurement section 405. In addition, these components only need to be included in the user terminal 20, and part or all of the components do not necessarily need to be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generation section 402 and signal allocation of the mapping section 403. Furthermore, the control section 401 controls signal reception processing of the received signal processing section 404 and signal measurement of the measurement section 405.

The control section 401 obtains, from the received signal processing section 404, a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

The control section 401 may perform control to form a transmission beam and/or a reception beam by using digital BF (e.g., precoding) of the baseband signal processing section 204 and/or analog BF (e.g., phase rotation) of each transmitting/receiving section 203. The control section 401 may perform control to form beams based on downlink channel information and uplink channel information. These pieces of channel information may be obtained from the received signal processing section 404 and/or the measurement section 405.

The control section 401 controls reporting of a measurement report associated with a predetermined reception beam based on a received DL signal. For example, the control section 401 determines the predetermined reception beam based on information notified from the radio base station or autonomously. Furthermore, the control section 401 may perform control to report a measurement report to which a reception beam is not applied, too, in addition to a measurement report to which the predetermined reception beam is applied.

Furthermore, the control section 401 may report a measurement report associated with an antenna port/panel notified from the radio base station or an autonomously determined antenna port/panel. Furthermore, the control section 401 may report information related to the predetermined beam when reporting the measurement report of the predetermined beam.

The transmission signal generation section 402 generates an uplink signal (such as an uplink control signal, an uplink data signal and an uplink reference signal) based on an instruction from the control section 401 to output to the mapping section 403. The transmission signal generation section 402 can be composed of a signal generator, a signal generation circuit and a signal generation apparatus described based on the common knowledge in the technical field according to the present invention.

For example, the transmission signal generation section 402 generates an uplink control signal related to transmission acknowledgement information and Channel State Information (CSI) based on, for example, the instruction from the control section 401. Furthermore, the transmission signal generation section 402 generates an uplink data signal based on the instruction from the control section 401. When, for example, the downlink control signal notified from the radio base station 10 includes a UL grant, the control section 401 instructs the transmission signal generation section 402 to generate an uplink data signal.

The mapping section 403 maps the uplink signal generated by the transmission signal generation section 402, on a radio resource based on the instruction from the control section 401 to output to each transmitting/receiving section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmitting/receiving section 203. In this regard, the received signal is, for example, a downlink signal (a downlink control signal, a downlink data signal and a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the receiving section according to the present invention.

The received signal processing section 404 outputs information decoded by the reception processing to the control section 401. The received signal processing section 404 outputs, for example, broadcast information, system information, RRC signaling and DCI to the control section 401. Furthermore, the received signal processing section 404 outputs the received signal and the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement and CSI measurement based on the received signal. The measurement section 405 may measure received power (e.g., RSRP), received quality (e.g., RSRQ or an SINR), a signal strength (e.g., RSSI) or channel information (e.g., CSI). The measurement section 405 may output a measurement result to the control section 401.

Hardware Configuration

In addition, the block diagrams used to describe the embodiments illustrate blocks in function units. These function blocks (components) are realized by an optional combination of hardware and/or software. Furthermore, means for realizing each function block is not limited in particular. That is, each function block may be realized by one physically and/or logically coupled apparatus or may be realized by a plurality of apparatuses formed by connecting two or more physically and/or logically separate apparatuses directly and/or indirectly (by way of, for example, wired connection or radio connection).

Figure 9:
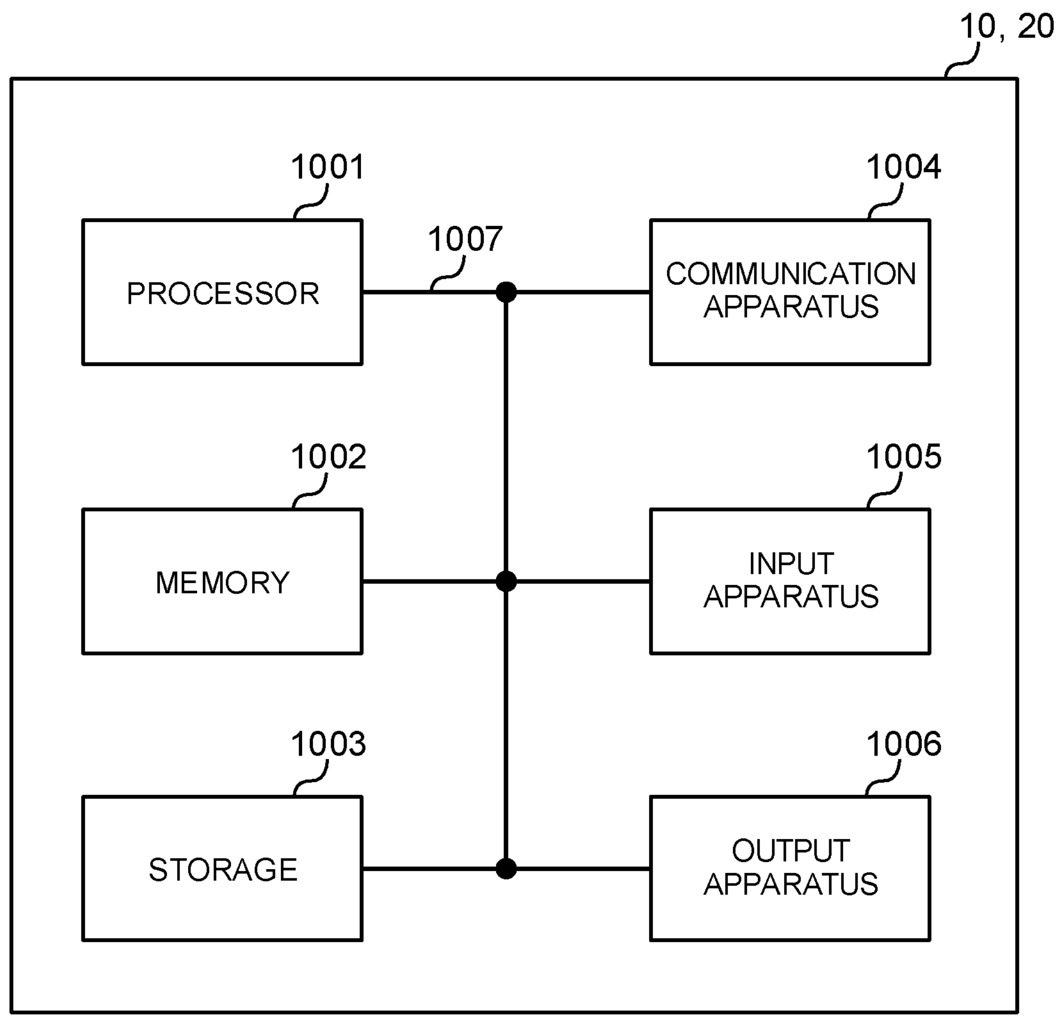
FIG. 9 is a diagram illustrating one example of hardware configurations of the radio base station and the user terminal according to one embodiment of the present invention.

For example, the radio base station and the user terminal according to the one embodiment of the present invention may function as computers that perform processing of the radio communication method according to the present invention. FIG. 9 is a diagram illustrating one example of hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 9 or may be configured without including part of the apparatuses.

For example, FIG. 9 illustrates only the one processor 1001. However, there may be a plurality of processors. Furthermore, processing may be executed by one processor or may be executed by one or more processors concurrently, successively or by another method. In addition, the processor 1001 may be implemented by one or more chips.

Each function of the radio base station 10 and the user terminal 20 is realized by causing hardware such as the processor 1001 and the memory 1002 to read predetermined software (program), and thereby causing the processor 1001 to perform an arithmetic operation, and control communication of the communication apparatus 1004 and reading and/or writing of data in the memory 1002 and the storage 1003.

For example, the processor 1001 causes an operating system to operate to control the entire computer. The processor 1001 may be composed of a Central Processing Unit (CPU) including an interface for a peripheral apparatus, a control apparatus, an arithmetic operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to the programs, the software module or the data. As the programs, programs that cause the computer to execute at least part of the operations described in the above embodiment are used. For example, the control section 401 of the user terminal 20 may be realized by a control program stored in the memory 1002 and operated by the processor 1001 or other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmitting/receiving device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmitting/receiving antennas 101 (201), amplifying sections 102 (202), transmitting/receiving sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed of a single bus or may be composed of buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

Modified Example

In addition, each term that is described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time domain. Each of one or a plurality of periods (frames) that composes a radio frame may be referred to as a subframe. Furthermore, the subframe may include one or a plurality of slots in the time domain. The subframe may be a fixed time duration (e.g., 1 ms) that does not depend on a numerology.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology. Furthermore, the slot may include a plurality of mini slots. Each mini slot may include one or a plurality of symbols in the time domain. Furthermore, the mini slot may be referred to as a sub slot.

All of the radio frame, the subframe, the slot, the mini slot and the symbol indicate time units for transmitting signals. The other corresponding names of the radio frame, the subframe, the slot, the mini slot and the symbol may be used. For example, one subframe may be referred to as a Transmission Time Interval (TTI). A plurality of continuous subframes may be referred to as TTIs. One slot or one mini slot may be referred to as a TTI. That is, the subframe and/or the TTI may be a subframe (1 ms) according to existing LTE, may be a period (e.g., 1 to 13 symbols) shorter than 1 ms or may be a period longer than 1 ms. In addition, a unit indicating the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a data packet (transport block) subjected to channel coding, a code block and/or a code word or may be a processing unit of scheduling or link adaptation. In addition, when the TTI is given, a time interval (e.g., the number of symbols) in which a transport block, a code block and/or a code word are actually mapped may be shorter than the TTI.

In addition, when one slot or one mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial TTI (partial or fractional TTI), a reduced subframe, a short subframe, a mini slot or a subslot.

In addition, the long TTI (e.g., a normal TTI or a subframe) may be read as a TTI having a time duration exceeding 1 ms, and the short TTI (e.g., a reduced TTI) may be read as a TTI having a TTI length less than the TTI length of the long TTI and equal to or more than 1 ms.

Resource Blocks (RBs) are resource block allocation units of the time domain and the frequency domain, and may include one or a plurality of continuous subcarriers in the frequency domain. Furthermore, the RB may include one or a plurality of symbols in the time domain or may have a length of one slot, one mini slot, one subframe or one TTI. One TTI or one subframe may be composed of one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, one RE may be a radio resource domain of one subcarrier and one symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in the slot, the numbers of symbols and RBs included in a slot or a mini slot, the number of subcarriers included in an RB, the number of symbols in a TTI, a symbol length and a Cyclic Prefix (CP) length can be variously changed.

Furthermore, the pieces of information and parameters described in this description may be expressed by absolute values, may be expressed by relative values with respect to predetermined values or may be expressed by other pieces of corresponding information. For example, a radio resource may be indicated by a predetermined index. Furthermore, numerical expressions used for these parameters may be different from those explicitly disclosed in this description.

Names used for parameters in this description are by no means restrictive ones. For example, various channels (the Physical Uplink Control Channel (PUCCH) and the Physical Downlink Control Channel (PDCCH)) and information elements can be identified based on various suitable names. Therefore, various names allocated to these various channels and information elements are by no means restrictive ones.

The pieces of information and the signals described in this description may be expressed by using one of various different techniques. For example, the data, the instructions, the commands, the pieces of information, the signals, the bits, the symbols and the chips mentioned in the above entire description may be expressed as voltages, currents, electromagnetic waves, magnetic fields or magnetic particles, optical fields, photons or optional combinations of these.

Furthermore, the pieces of information and the signals can be output from a higher layer to a lower layer and/or from the lower layer to the higher layer. The pieces of information and the signals may be input and output via a plurality of network nodes.

The input and output pieces of information and signals may be stored in a specific location (e.g., memory) or may be managed by a management table. The input and output pieces of information and signals can be overwritten, updated or additionally written. The output pieces of information and signals may be deleted. The input pieces of information and signals may be transmitted to other apparatuses.

Information may be notified not only according to the aspect/embodiment described in this description but also by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIB) and System Information Blocks (SIB)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRC Connection Setup message or an RRC Connection Reconfiguration message. Furthermore, the MAC signaling may be notified by, for example, an MAC Control Element (MAC CE).

Furthermore, notification of predetermined information (e.g., notification of "being X") may be made not only explicitly but also implicitly (by, for example, not notifying this predetermined information or by notifying another information).

Decision may be performed based on a value (0 or 1) expressed by one bit, may be performed based on a boolean expressed by true or false or may be performed by comparing numerical values (e.g., comparison with a predetermined value).

Irrespectively of whether software is referred to as software, firmware, middleware, a microcode or a hardware description language or as other names, the software should be widely interpreted to mean an instruction, an instruction set, a code, a code segment, a program code, a program, a subprogram, a software module, an application, a software application, a software package, a routine, a subroutine, an object, an executable file, an execution thread, a procedure or a function.

Furthermore, software, instructions and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is referred to as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each small area can provide communication service via a base station subsystem (e.g., indoor small base station (RRH: Remote Radio Head)). The term "cell" or "sector" indicates part or the entirety of the coverage area of the base station and/or the base station subsystem that provides communication service in this coverage.

In this description, the terms "Mobile Station (MS)", "user terminal", "User Equipment (UE)" and "terminal" can be compatibly used. The base station is also referred to as the term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, specific operations performed by the base station are performed by an upper node of this base station depending on cases. Obviously, in a network including one or a plurality of network nodes including the base stations, various operations performed to communicate with a terminal can be performed by base stations or one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity and the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" "calculating", "computing", "processing", "deriving", "investigating", "looking up" (e.g., looking up in a table, a database or another data structure) and "ascertaining". Furthermore, "deciding (determining)" may be regarded to "decide (determine)" "receiving" (e.g., receiving information), "transmitting" (e.g., transmitting information), "input", "output" and "accessing" (e.g., accessing data in a memory). Furthermore, "deciding (determining)" may be regarded to "decide (determine)" "resolving", "selecting", "choosing", "establishing" and "comparing". That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access". It can be understood that, when used in this description, the two elements are "connected" or "coupled" with each other by using one or more electric wires, cables and/or printed electrical connection, and by using electromagnetic energy having wavelengths in radio frequency domains, microwave domains and (both of visible and invisible) light domains in some non-restrictive and incomprehensive examples.

When the words "including" and "comprising" and modifications of these words are used in this description and the claims, these words intend to be comprehensive similar to the word "having". Furthermore, the word "or" used in this description and the claims intends not to be an exclusive OR.

The present invention has been described in detail above, yet it is obvious for a person skilled in the art that the present invention is not limited to the embodiments described in this description. The present invention can be carried out as modified and changed aspects without departing from the gist and the scope of the present invention defined by the recitation of the claims. Accordingly, the disclosure of this description intends for exemplary explanation, and does not have any restrictive meaning to the present invention.

The invention claimed is:

1. A terminal comprising:

a transmitter that transmits information regarding at least one reception power (RSRP: Reference Signal Received Power); and a processor that, when reporting of a first RSRP and a second RSRP is carried out, controls to transmit a value corresponding to the first RSRP, and a value corresponding to a difference between the first RSRP and the second RSRP, wherein the first RSRP has a largest measured value out of measured RSRPs.

2. The terminal according to claim 1, wherein the processor determines a number of reporting RSRPs based on information notified by a base station.

3. The terminal according to claim 1, wherein the processor coupled to the transmitter carries out reporting of the RSRP based on at least one channel state information reference signal resource.

4. The terminal according to claim 2, wherein the processor coupled to the transmitter carries out reporting of the RSRP based on at least one channel state information reference signal resource.

5. The terminal according to claim 3, further comprising: a receiver that receives the channel state information reference signal with a predetermined reception beam.

6. A radio communication method comprising:

transmitting information regarding at least one reception power (RSRP: Reference Signal Received Power); and when reporting of a first RSRP and a second RSRP is carried out, controlling transmission of a value corresponding to the first RSRP, and a value corresponding to a difference between the first RSRP and the second RSRP, wherein the first RSRP has a largest measured value out of measured RSRPs.

7. A radio base station comprising:

a receiver that receives information regarding at least one reception power (RSRP: Reference Signal Received Power); and a processor that, when receiving of a first RSRP and a second RSRP is carried out, controls to receive a value corresponding to the first RSRP, and a value corresponding to a difference between the first RSRP and the second RSRP, wherein the first RSRP has a largest measured value out of measured RSRPs.

* * * * *